(12) United States Patent
Singh et al.

(10) Patent No.: US 6,206,191 B1
(45) Date of Patent: Mar. 27, 2001

(54) RUPTURABLE CONTAINER OF AMPHIPHILIC MOLECULES

(76) Inventors: Brij P. Singh, 13010 Morning Star Dr.; Pramod K. Arora, 5144 Pinckneya Dr., both of North Royalton, OH (US) 44133

( * ) Notice: Subject to any disclaimer, the term of this patent is extended or adjusted under 35 U.S.C. 154(b) by 0 days.

(21) Appl. No.: 09/444,611

(22) Filed: Nov. 23, 1999

Related U.S. Application Data

(62) Division of application No. 09/084,944, filed on May 26, 1998.

(51) Int. Cl.[7] ............................................. B65D 85/84
(52) U.S. Cl. ............................................. 206/524.1
(58) Field of Search ................... 206/528, 524.1, 206/532, 568, 819; 215/47

(56) References Cited

U.S. PATENT DOCUMENTS

| | | | |
|---|---|---|---|
| 3,749,271 | * | 7/1973 | Ellis, Jr. et al. ................... 215/32 |
| 4,719,133 | * | 1/1988 | Woudsma ........................ 206/524.1 |
| 4,753,788 | * | 6/1988 | Gamble ............................... 424/1.1 |
| 4,979,630 | * | 12/1990 | Rose et al. ............................ 215/32 |
| 4,995,519 | * | 2/1991 | Rose et al. ............................ 215/32 |
| 5,084,302 | | 1/1992 | Inoue et al. . |
| 5,143,745 | * | 9/1992 | Maganas et al. ...................... 427/8 |
| 5,166,000 | | 11/1992 | Singh et al. . |
| 5,654,092 | * | 8/1997 | Hickel et al. ...................... 428/333 |

FOREIGN PATENT DOCUMENTS

| | | |
|---|---|---|
| 3638379 A1 | 5/1987 | (DE) . |
| 4112632 A1 | 10/1992 | (DE) . |
| 0139318 A1 | 5/1985 | (EP) . |
| 04925454 A2 | 7/1992 | (EP) . |
| 0582131 A1 | 2/1994 | (EP) . |

* cited by examiner

Primary Examiner—David T. Fidei
(74) Attorney, Agent, or Firm—Jones, Day, Reavis & Pogue

(57) ABSTRACT

A rupturable container that contains vaporizable amphiphilic molecules for use in forming films on substrates. The container is ruptured to release the amphiphilic molecules which are vaporized by heat and allowed to settle on a substrate.

8 Claims, 2 Drawing Sheets

RUPTURABLE CONTAINER OF AMPHIPHILIC MOLECULES

This application is a division of copending U.S. Ser. No. 09/084,944 filed May 26, 1998.

BACKGROUND OF THE INVENTION

This application relates to the art of ultra thin films and, more particularly, to such films that are formed of amphiphilic molecules. The invention is particularly applicable to a method of applying such films to substrate surfaces and will be described with specific reference thereto. However, it will be appreciated that certain features of the invention have broader aspects, and may be used in other methods as well as for other purposes.

Polymerizable amphiphilic molecules having the intrinsic ability to self-assemble in a thin film are well known. By way of example, descriptions of such materials and their ability to form thin films are contained in: W. C. Bigelow et al, J. Colloid. Sci., 1, 513–538 (1946); L. H. Lee, J. Colloid. & Interface Sci., 27, 751–760 (1968); E. E. Polymeropoulos et al, J. Chem. Phys., 69, 1836–1847 (1978); and J. Sagiv, U.S. Pat. No. 4.539,061, issued Sep. 3, 1985. The disclosures of which are hereby incorporated herein by reference. These publications disclose compositions that include solvents in which a film forming substance is soluble, and the solvents usually are toxic and environmentally unfriendly. Highly liquid compositions also lose their usefulness very rapidly when exposed to airborne moisture because the amphiphilic molecules are highly reactive with water and tend to form molecular agglomerations that precipitate out of the solution.

Compositions and methods for use in applying ultra thin films of self-assembling amphiphilic molecules to substrate surfaces are described in our commonly assigned U.S. Pat. Nos. 5,078,791; 5,106,561; 5,166,000; 5,173,365; 5,204,126; 5,219,654 and 5,300,561, the disclosures of which are hereby incorporated herein by reference. These compositions and methods are advantageous for providing ultra thin films on porous and non-porous surfaces of such materials as glass, ceramic, porcelain, fiber glass, metals and plastics. The film serves one or more of a variety of purposes including scratch resistance, corrosion protection, protection for anti-reflective coatings on lenses, friction reduction, print priming, moisture barriers, and the like. For example, the films may be used for coating laboratory glassware and for providing a non-stick coating for pots, pans, dishes or utensils. These films are particularly advantageous for use on anti-reflective glass and plastic lens surfaces, including plastic eyewear lenses manufactured from CR-39 (trademark of PPG Industries), polycarbonate and high index resins that are pre-treated with a hard coat for scratch resistance.

The gas phase reaction of different amphiphilic organosilanes with a silica surface in vacuum cell has been reported by a number of authors: J. Phys. Chem 70, 2937 (1966); Trans. Faraday. Soc., 63, 2549 (1967); J. Phys. Chem., 73, 2372 (1969); Langmuir, 7, 923 (1991). The disclosures of which are hereby incorporated herein by reference. Commercial hydrophobic fumed silicas such as Aerosil R 972 from Degussa Corp. and Cab-O-Sil TT-610 from Cabot Corp. are produced using dichlorodimethylsilane by gas phase reactions. Recently, others have also reported the formation of hydrophobic silica using other amphiphilic alkylsilanes in a gas phase reaction inside a vacuum cell: Langmuir, 9, 3518 (1993); Langmuir, 13, 1877 (1997). The disclosures of which are hereby incorporated herein by reference. The reactions reported in these articles were performed to coat silica at very high temperatures in the range of 200–300° C. or higher. A lower temperature inside the cell results in the absence of any coating on the silica surface because the molecules used in the process require a high temperature for achieving a thermal reaction. Also, the process requires steam hydration followed by dehydration at a high temperature of 400° C. or above along with degassing. The apparatus and the process are limited to preparation of small samples of the coated material because an extremely strong vacuum is required and the vacuum cell is small.

The use of prior compositions and methods to form a film on a substrate surface leaves excess composition on the surface that must be removed. Disposal of this excess material is difficult, and it is difficult to remove from the excess material from irregular surfaces. Large articles and surfaces with microstructures are difficult to coat when using prior compositions and methods, and the process is very slow. Prior methods require large quantities of coating composition that usually is obtained by repeatedly removing smaller quantities from one open container so that vigilance is necessary to prevent contamination of the composition and exposure to moisture.

It would be desirable to have a process for applying hydrophobic thin films of amphiphilic molecules to different surfaces in a manner that is very fast and cost effective. It would also be desirable to have a process that could be used to coat substrate surfaces of any size or shape without requiring removal of excess coating composition and disposal of same.

SUMMARY OF THE INVENTION

In accordance with the present application, thin films of amphiphilic molecules are formed on substrate surfaces by vapor phase coating. Vapor phase reactions are usually clean and very fast, and the need to dispose of excess material or clean the coated surfaces is minimized.

In accordance with the present application, a vacuum chamber containing substrates to be coated is charged with polymerizable amphiphilic molecules in a gas phase. The amphiphilic molecules spontaneously self-assemble and bond to the substrate surfaces in a substantially continuous thin film by reactions and forces of the type discussed in the aforementioned articles by Bigelow et al, L. H. Lee, E. E. Polymeropoulos et al, and J. Sagiv. In one arrangement, the vacuum chamber is charged with polymerizable amphiphilic molecules in a gas phase by placing within the vacuum chamber with the substrates to be coated a quantity of the molecules in their liquid or solid state. After a vacuum is established in the chamber, the molecules in their liquid or solid state are heated and vaporized to charge the chamber with molecules in their gas phase.

In another arrangement, polymerizable amphiphilic molecules are converted to their gas phase externally of the vacuum chamber and introduced into the chamber after a vacuum has been established therein.

The gas phase molecules spontaneously spread uniformly throughout the vacuum chamber and come into contact with the substrate surfaces to self-assemble thereon and bond thereto in a substantially continuous film of substantially uniform thickness.

The vacuum that is established in the vacuum chamber is between $2 \times 10^{+2}$ and $5 \times 10^{-4}$ torr. The principal requirement for the vacuum is that it should be sufficient to promote spontaneous uniform dispersal of the gas phase molecules throughout the chamber when the gas phase molecules are introduced into the chamber either from outside the chamber or by vaporization inside the chamber.

The temperature of the vacuum chamber preferably is between 20° C. and 100° C., and most preferably between 30° C. and 50° C. If the temperature is too low, the gas phase amphiphilic molecules will not be sufficiently active for good uniform dispersal throughout the chamber and contact with substrate surfaces. If the temperature is too high, the gas phase amphiphilic molecules will be too active to self-assemble on substrate surfaces.

The temperature of the vacuum chamber also must be low enough to prevent complete dehydration of the substrate surfaces. Although the substrate surfaces appear visibly dry and are completely dry to the touch, they contain residual traces of airborne moisture that reacts with the amphiphilic molecules to produce the chemical bond between the molecules and the substrate surfaces.

Very small quantities of liquid or solid polymerizable amphiphilic molecules are used to charge the vacuum chamber with gas phase amphiphilic molecules. The amount of liquid or solid polymerizable amphiphilic molecule material that is used is between $(1-100)\times 10^{-2}$ mmole per cubic foot of vacuum chamber volume. More preferably, the amount is between $(1-30)\times 10^{-2}$ mmole per cubic foot of vacuum chamber volume. Most preferably, the amount is between $(2-10)\times 10^{-2}$ mmole per cubic foot of vacuum chamber volume.

Thin films that are formed on substrate surfaces in accordance with the present application may have a thickness between 2 and 50 nanometers. Usually, the film will be monomolecular and at the lower end of the thickness range. The thickness may vary depending on the type and quantity of amphiphilic molecule material used, the temperature of the vacuum chamber, the degree of vacuum and the time that the substrates are left in the vacuum chamber exposed to the gas phase molecules. After the vacuum chamber is charged with polymerizable amphiphilic molecules in the gas phase, substrate surfaces may be exposed to the gas phase molecules for anywhere from 10 seconds to 30 minutes, more preferably 30 seconds to 10 minutes, and most preferably 30 seconds to 5 minutes.

Following exposure of the substrate surfaces to the gas phase amphiphilic molecules for the desired time to form a continuous thin film, the gas phase molecules are exhausted from the vacuum chamber which is then flooded with air at atmospheric pressure to allow opening of the chamber for removal of the coated substrates and insertion of uncoated ones.

A variety of different substrate materials can be provided with thin films of amphiphilic molecules in accordance with the method of the present application. Suitable substrate materials include, but are not necessarily limited to, glass, ceramic, porcelain, plastics, anti-reflective coatings on glass or plastic lenses or other surfaces and certain metal surfaces such as silver, gold, silicon, aluminum, germanium chromium, titanium and zirconium and the like.

When the gas phase molecules are introduced to the vacuum chamber by vaporization of amphiphilic molecule material within the chamber itself, a frangible or rupturable sealed container of the material, such as a glass ampoule or a DSC cup as shown in the drawing, is placed in the chamber with the substrates to be coated. Following establishment of the vacuum, the container is ruptured and the amphiphilic molecule material is rapidly heated to vaporize same for dispersal throughout the chamber. The sealed rupturable container contains less than 5 grams of amphiphilic molecule material and usually between 0.5 and 5 grams. The sealed rupturable container is purged of air and preferably contains an inert gas such as argon or nitrogen. The free space within the sealed rupturable container that is not occupied by amphiphilic molecule material is at least 90% free of air and more preferably 95–100% free of air to avoid exposure of the amphiphilic molecule material to airborne moisture.

It is a principal object of the invention to provide an improved method for coating substrates with amphiphilic molecules at relatively low temperatures.

It is another object of the invention to provide such a method that minimizes environmental problems.

It is a further object of the invention to provide such a method that is energy and time efficient.

It also is an object of the invention to provide such a method that can be used to coat many different substrate materials and shapes.

It is another object of the invention to provide such a method that requires little or no cleaning of the substrate surfaces after it has been coated with a thin film.

DESCRIPTION OF PREFERRED EMBODIMENTS

Figure 1:
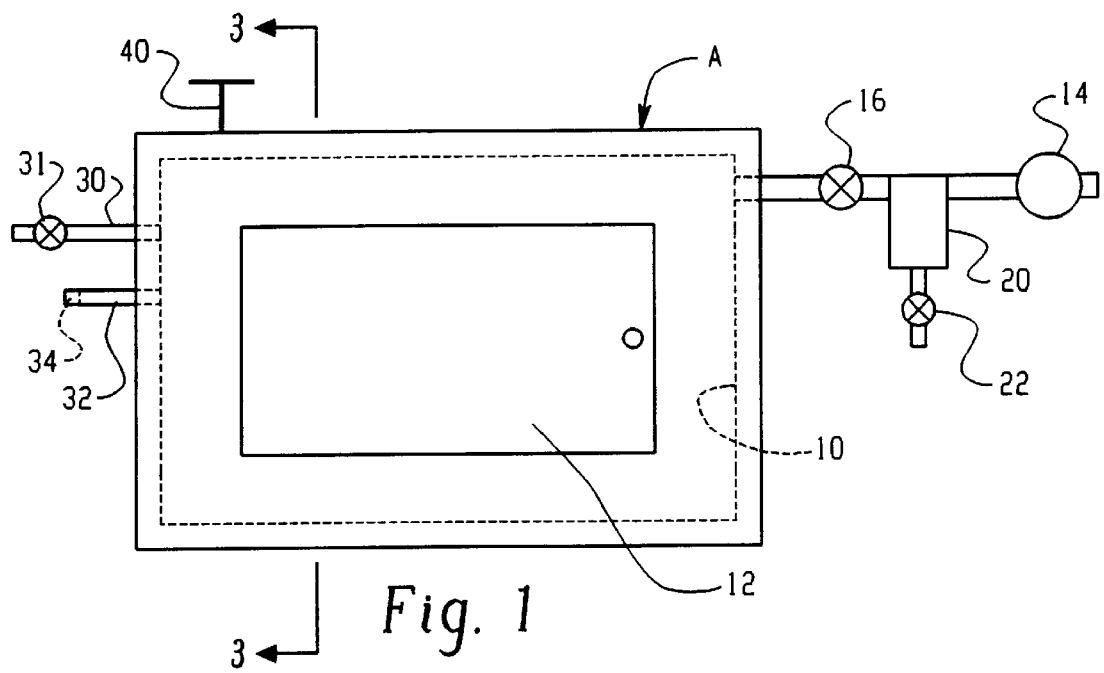
FIG. 1 is a front conventional view of a conventional vacuum chamber for use in the method of the present application.

As used in the context of this invention, a film forming substance is one containing amphiphilic molecules that are capable of self-assembly, self-polymerization and chemical bonding to chemical groups on the substrate surface or within the surface matrix to form a substantially continuous ultra thin film of substantially uniform thickness. A substantially continuous film is one that is substantially unbroken except for the presence of relatively minor defects or imperfections, such as random and widely scattered pinholes.

An amphiphile contains a polar region and a non-polar region. Amphiphiles that can be used to form thin films in accordance to the present application include, but are not necessarily limited to, the following:

The polar segment of the amphiphile can be a carboxylic acid, alcohols, thiols, primary, secondary and tertiary amines, cyanides, silane derivatives and sulfonates and the like.

The non-polar or apolar component typically consists mainly of alkyl or partial and per fluorinated alkyl groups, alkyl ether or partial and perfluorinated alkyl ether groups. These apolar regions may include diacetylene, vinyl-unsaturated or fused linear or branched aromatic rings.

In one preferred arrangement, the film forming substance consists essentially of RmSiXn where the non-polar R is an alkyl, fluorinated alkyl, alkyl ether or fluorinated alkyl ether of about 1–30 carbons and most preferably about 6–30 carbon atoms. The alkyl chain may contain the diacetylene, vinyl-unsaturated, single aromatic and fused linear or branched aromatic rings. In the above formula X is selected from the group consisting essentially of halogens hydroxy, alkoxy and acetoxy. In the formula, m is 1–3, n is 1–3 and m+n equal 4. In still another preferred arrangement, R may be a substituted silane or siloxane.

In another preferred arrangement, the film forming substance consists essentially of $R_mSH_n$, where R is an alkyl, fluorinated alkyl, an alkyl ether or a fluorinated alkyl ether, S is sulfur and H is hydrogen. The alkyl chain may contain diacetylene, vinyl, single aromatics, or fused linear or branched aromatic moieties. In the formula, m is 1–2 and n is 0–1.

In another preferred arrangement, the film forming substance consists essentially of RX, where R is an alkyl, fluorinated alkyl, an alkyl ether or a fluorinated alkyl ether. The alkyl chain may contain diacetylene, vinyl-unsaturated, single aromatic, or fused linear or branched aromatic moieties and, X is selected from the groups of —COOH, —OH and —NH2.

Methods for applying ultra thin films of amphiphilic molecules to different substrates having surfaces that are chemically reactive with amphiphilic molecules are described in the articles and the U.S. patents incorporated by reference above. The molecules attach themselves to the substrate surface by various reactions and forces, and are primarily chemically bound to the surface. The molecules self-assemble and self-polymerize on the surface to form the substantially continuous ultra thin film having a substantially uniform thickness.

The method of the present application allows application of ultra thin films in a very fast and efficient manner to substrates that have irregular surface shapes including shallow engraved profiles or patterns. When these substrates are exposed to the vaporized gas phase amphiphilic molecules inside the vacuum chamber, the amphiphilic molecules selfassemble on the surface of the substrate to form a continuous and uniform thin film.

A vacuum chamber for use in the method of the present application may be an insulated rectangular metal box having a door which is sealed by a gasket when closed and allows insertion and removal of items. This box has an inside chamber that is attached with a high vacuum pump capable of drawing a vacuum of $10^{-4}$ torr. The inside chamber is equipped with separate heating devices for heating the chamber and for vaporizing the amphiphilic material. A number of different devices such as resistance electrodes, a resistance heater, an induction coil or an electron beam can be used for rapidly heating the amphiphilic materials to a high temperature for vaporization. A simple electric heater block may be used for this purpose.

The substrates to be coated with hydrophobic films are placed inside the vacuum chamber. The amphiphilic material either in the sealed ampoule or the DSC cup is also placed in the heating device inside the chamber and the door is closed. A strong vacuum between $2 \times 10^{+2}$ and $5 \times 10^{-4}$ torr quickly is applied to the chamber. The valve connecting the pump to the chamber is closed to keep the chamber at constant high vacuum. The amphiphiic material ampoule is broken open by the device inside the chamber and heated quickly to vaporize the material. The glass ampoule can also be broken open outside by hand and then put it in the heating device inside the chamber just before closing the door. The gas phase amphiphilic molecules spread uniformly very fast throughout the whole chamber. As the amphiphiic molecule material vaporizes, the vacuum inside the chamber does rise a bit but remains within the range of $2 \times 10^{-2}$ to $5 \times 10^{-4}$ torr. The chamber is kept in this condition for a time of 30 seconds to 30 minutes. During this time the amphiphilic molecules self-assemble and attach themselves to the surface of the substrate and form a continuous uniform thin film.

After the selected time, the vacuum pump valve is opened to evacuate the excess gas phase amphiphilic material from the chamber. A cold trap or condenser between the chamber and the pump condenses and traps the excess amphiphilic material vapor and does not allow it to escape to the atmosphere. Clean air is let into the chamber to bring it up to atmosphere pressure and the chamber is opened to remove the coated substrates.

The substrates may be coated at chamber temperatures between 20–100° C. and more preferably between 30° C. and 50° C. The amount of amphiphilic material used may be from $(1-100) \times 10^{-2}$ mmole per cubic foot of chamber volume. A number of different substrates such as glass, ceramic, porcelain, metals, plastics and anti-reflective surfaces are coated with a thin film by the above process.

As an example, anti-reflective eyeglass lenses are put inside the vacuum chamber. A sealed ampoule containing $(1-100) \times 10^{-2}$ mmole, preferably $(1-30) \times 10^{-2}$ mmole and most preferably $(2-10) \times 10^{-2}$ mmole of the amphiphilic material $R_mSiX_n$ per cubic foot of the vacuum chamber volume. is put in the heating device and the door is closed. A high vacuum of $2 \times 10^{-2}$ torr is applied to the chamber. The pump valve is closed to keep the chamber and the lenses at this negative pressure. The ampoule is broken open by the device inside the chamber and the material in the ampoule is heated at 250–350° C. for 30 seconds to a minute to completely vaporize it. The chamber is kept under these conditions for another 30 seconds. The vacuum pump valve then is opened and the chamber is evacuated to remove the excess gaseous film forming material. The chamber then is flooded with clean air to bring it to atmospheric pressure and opened for removing the lenses coated with an hydrophobic ultra thin film of amphiphilic molecules.

In a second example, anti-reflective eyeglass lenses are placed inside the chamber. An ampoule containing the coating material as mentioned above is opened by hand and put in the heating unit inside the chamber. The chamber door is closed and a vacuum of $2 \times 10^{-2}$ torr is applied. The pump valve is closed and the amphiphilic material is quickly vaporized by heating it at 250–350° C. The chamber is kept closed for another 30 seconds followed by evacuation of the excess gaseous material from the chamber and flooding same with clean air at atmospheric pressure. The chamber then is opened to remove the lenses coated with an hydrophobic ultra thin film of amphiphilic molecules.

In a third example anti-reflective eyeglass lenses are put inside the chamber. A DSC cup containing $(2-10) \times 10^{-2}$ mmole of amphiphilic material per cubic foot of chamber volume is placed in the heating device in the chamber. The door is closed and a high vacuum of $2 \times 10^{-2}$ torr is applied followed by closing of the pump valve to keep the chamber at this pressure. The DSC cup then is heated at 250–350° C. for 1–2 minutes to vaporize the material inside the DSC cup. The resulting high pressure within the two part DSC cup causes the parts to separate and the amphiphilic material gas is released into the chamber. The molecules in the vapor phase reach the surface of the lenses and spontaneously self-assemble to form a uniform hydrophobic ultra thin film on them. After 30 seconds to 2 minutes the chamber is evacuated to remove the excess vapor and flooded with clean air at atmospheric pressure. The chamber then is opened to remove the coated lenses.

In a fourth example, laboratory ware such as round bottom flasks, beakers. Erlenmeyer flasks, and some pipettes are placed inside the chamber along with an ampoule of amphiphilic material in the heating device. After closing the chamber door, a vacuum is applied and the ampoule is broken open and heated to vaporize the amphiphilic material. After 30 seconds to 2 minutes the excess vapor in the chamber is evacuated by the pump and the chamber is flooded with clean air at atmospheric pressure to permit opening of the door. Both inside and outside surfaces of the laboratory ware were coated well with the hydrophobic thin film.

In a fifth example, glass cookware, dishes and coffeepots were put inside the chamber. An ampoule or a DSC cup containing amphiphilic molecules was placed in the chamber. A vacuum of about $2 \times 10^{-2}$ torr is established in the chamber and the amphiphilic material is vaporized as described above. After exposure to the vapors for 1–2 minutes the chamber is evacuated and flooded with clean air at atmospheric pressure. The film provides a non-stick coating on the cookware.

In a sixth example, plastic lenses made of resins such as CR-39 (trademark of PPG. Ind.) polycarbonate, and high index resin with and without scratch resistant coatings were placed inside the chamber at a temperature of 50° C. with a DSC cup containing amphiphilic molecules as previously described. After achieving the required vacuum of $2 \times 10^{-2}$ torr the pump valve is closed and the gas phase amphiphilic material is released in the chamber by heating the DSC cup as described above. The lenses are exposed to the gaseous material for 5–10 minutes followed by evacuation of the vapor and flooding the chamber with clean air at atmospheric pressure. The chamber then is opened and the lenses removed. All lenses were well coated with the hydrodhobic thin film of amphiphilic molecules. Using a glass ampoule containing amphiphilic molecule material in place of the DSC cup gave same results.

In a seventh example, a few clean silicon wafers were placed inside the chamber with an opened ampoule of amphiphilic material. A vacuum of $2 \times 10^{-2}$ torr was established in the chamber followed by vaporization of the amphiphilic material. The wafers were treated for one minute followed by evacuation of the vapor and flooding the chamber with air at atmospheric pressure. All wafers were coated very well with the hydrophobic thin film of amphiphilic molecules.

In an eighth example, substrates like touch-a-screen, CRT's and photocopy machine top glass plates were coated successfully by the above process.

In a ninth example, a number of different polished metal surfaces, such as gold and silver, were put in the chamber with an ampoule of amphiphilic material RmSHn. The remaining steps were carried out as described above. After the process, the metal surfaces were coated well with the hydrophobic thin film of amphiphilic molecules.

FIG. 1 shows a vacuum cabinet A having an internal vacuum chamber 10 that can be selectively heated to a desired temperature in a known manner. A door 12 selectively provides access to the interior of chamber 10.

A vacuum pump 14 is attached with chamber 10 through a valve 16, and a condenser or cold trap 20 which is interposed between chamber 10 and vacuum pump 14. A suitable valved outlet 22 is provided for condenser 20.

An inlet 30 with a valve 31 may be provided to the interior of vacuum chamber 10. Another conduit attached with chamber 10 is indicated at 32 and has a rubber septum 34 through which a syringe needle may be extended for injecting material to chamber 10. Rubber septum 34 seals itself when the needle is withdrawn.

A rotatable rod 40 extends through a suitable seal to the interior of chamber 10 and has a laterally extending arm 42 at its bottom end within chamber 10. This rod could be rotated manually or mechanically to rupture the ampoule.

A stainless steel holder B having a cup 50 and oppositely extending arms 51 and 52 is positioned within chamber 10. Arms 51 and 52 have holes therethrough receiving upright pins 53 and 54 to stabilize holder B. Cup 50 is shown resting on a conventional electric resistance heater 60. It will be recognized that other heating arrangements are also possible. For example, pins 53 and 54 could be electrodes so that stainless steel holder B itself would be a resistance heater. Cup 50 can also be positioned within an induction coil for heating same. A sealed frangible glass ampoule C is closely received within cup 50 and includes a container portion 62 and a frangible portion 64. Rod 40 may be rotated to engage arm 42 with frangible portion 64 of ampoule C to break same from container portion 62 and expose the contents thereof to chamber 10.

Figure 2:
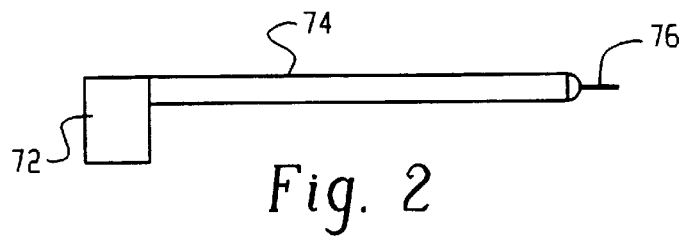
FIG. 2 is an elevational view of an external arrangement for vaporizing amphiphilic molecule material.
Figure 3:
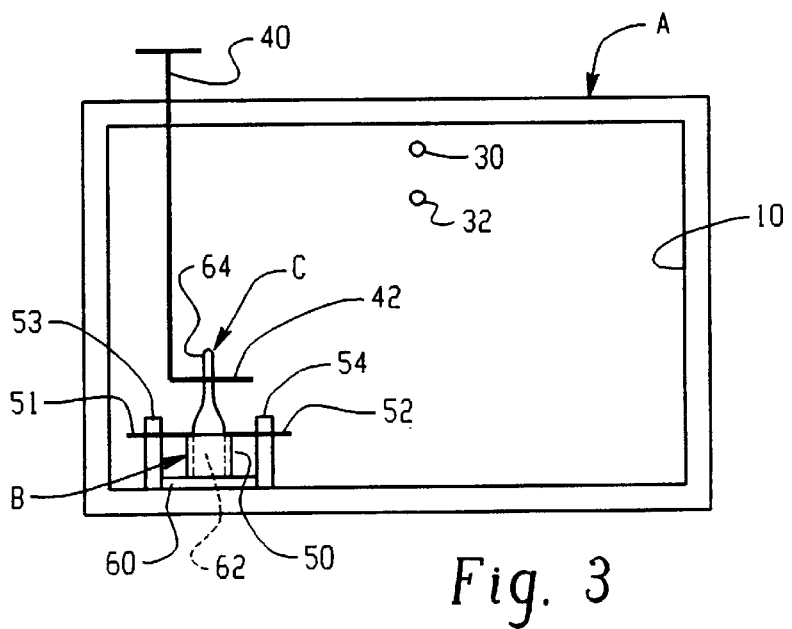
FIG. 3 is a cross-sectional elevational view taken generally on line 2—2 of FIG. 1.

FIG. 2 shows a container 72 in which a small quantity of amphiphilic molecule material is placed. Container 72 is heated by an electrical heater or by a flame to vaporize the amphiphilic molecule material. Vaporization of the material allows the vapors to travel through a glass or metal tube 74 that may be attached to valved inlet 30 for feeding vapor to chamber 10. A syringe needle 76 may be provided on the end of the glass or metal tube 74 for piercing rubber septum 34 to feed gas phase molecules to the interior of chamber 10.

In operation of the device, door 12 is opened to place substrates to be coated in vacuum chamber 10. Door 12 is then closed and vacuum pump 14 is turned on until the desirable strong vacuum is developed in chamber 10. Valve 16 then is closed to seal chamber 10. Vaporized amphiphilic molecules in their gas phase are then introduced to chamber 10. This may be done by vaporizing amphiphilic molecule material within chamber 10. When that is done, a rupturable container of amphiphilic molecule material is placed within chamber 10 at the same time as the substrates to be coated. In the alternative. the amphiphilic molecule material may be vaporized externally of chamber 10 and introduced thereto through conduits 30 or 32. After the substrates have been exposed to the gas phase molecules for a desired period of time, usually 30 seconds to 30 minutes, valve 16 is open along with valve 31 and vacuum pump 14 is started to exhaust the excess gas phase amphiphilic molecules which are condensed in condenser 20. Air at atmospheric pressure also flows into chamber 10 so that door 12 can be opened for removing coated articles.

Figure 4:
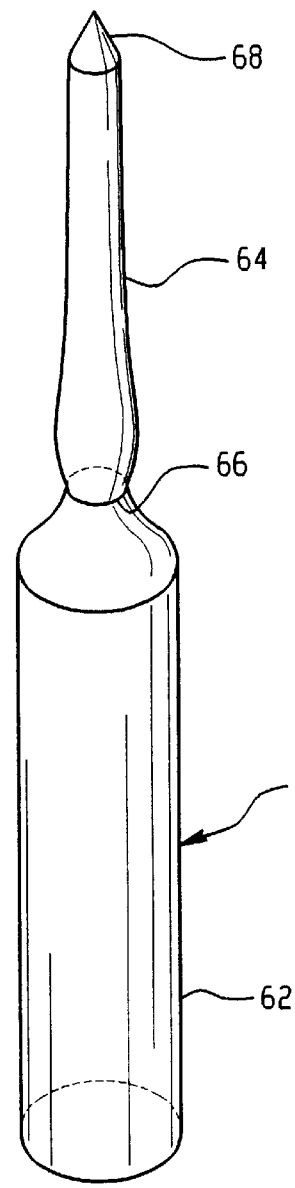
FIG. 4 is an elevational view of a frangible ampoule used in the method of the present application.

FIG. 4 shows a frangible glass ampoule C having a container portion 62 and a frangible portion 64 that is designed to break at 66. Ampoule 62 is purged of air by flooding it with an inert gas such as argon or nitrogen and a desired quantity, less than 5 grams, of amphiphilic molecule material is placed in container portion C. The end of frangible portion 64 then is sealed as indicated at 68. The free space within ampoule C that is not occupied by the amphiphilic molecule material preferably is at least 90% free of air and more preferably 95–100% free of air. This prevents reaction of the amphiphilic molecule material with any airborne moisture.

Figure 5:
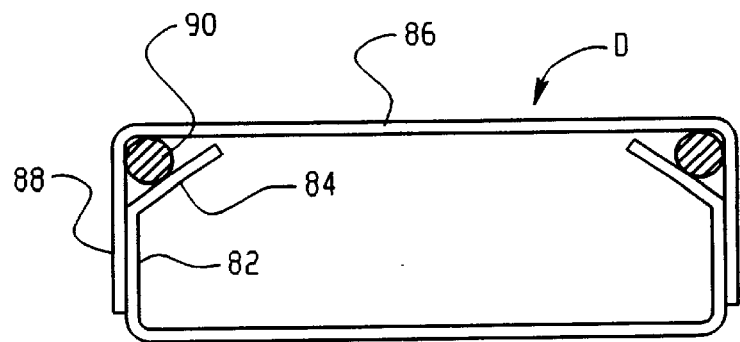
FIG. 5 is a cross-sectional elevational view of a Differential Scanning Calorimetry container used in the method of the present application.

FIG. 5 shows a Differential Scanning Calorimetry container D that also is known as a DSC container. The container includes a cup 80 having a circular peripheral wall 82 that terminates in an inwardly inclined portion 84. A cover 86 has a circular peripheral wall 88 that is an interference fit on cup wall 82. An O-ring 90 is positioned between cover 86 and inclined wall 84 for sealing the interior of cup 80. With lid 86 removed, cup 80 is purged of air by flooding same with an inert gas such as argon or nitrogen. A desirable quantity of amphiphilic molecule material, less than 5 grams, then is placed in cup 80 followed by sealing of cover 86 to cup 80. When DSC cup D is placed in stainless steel holder B and heated, the vapor pressure inside forces cover 86 off from cup 80 to release the vaporized amphiphilic molecules for dispersal in chamber 10. Obviously, other types of sealed rupturable containers may be used for protecting the amphiphilic molecule material until it is desirable to vaporize same to its gas phase for dispersal in vacuum chamber 10.

Although the invention has been shown and described with respect to preferred embodiments, it is obvious that equivalent alterations and modifications will occur to others skilled in the art upon the reading and understanding of this specification. The present invention includes all such equivalent alterations and modifications, and is limited only by the scope of the claims.

We claim:

1. A sealed rupturable container containing less than 5 grams by weight of heat vaporizable amphiphilic molecules.

2. The container of claim 1 wherein said container comprises a frangible ampoule.

3. The container of claim 1 wherein said container comprises a cup having a separable lid sealed thereto.

4. The container of claim 1 wherein said container includes an internal free space that is unoccupied by said amphiphilic molecules and said free space is at least 90% free of air.

5. The container of claim 4 wherein said free space is 95–100% free of air.

6. The container of claim 5 wherein said free space is filled with an inert gas.

7. The container of claim 1 wherein said container includes an internal free space that is unoccupied by said amphiphilic molecules and said free space is filled with an inert gas.

8. The container of claim 1 wherein said container is rupturable by internal pressure produced by heating and vaporization of said amphiphilic molecules therein.

* * * * *